United States Patent [19]

Hayashi

[11] 4,295,550
[45] Oct. 20, 1981

[54] VISCOUS FLUID COUPLING DEVICE

[75] Inventor: Masaharu Hayashi, Toyota, Japan

[73] Assignee: Aisin Seiki Kabushiki Kaisha, Kariya, Japan

[21] Appl. No.: 96,329

[22] Filed: Nov. 21, 1979

[30] Foreign Application Priority Data

Nov. 28, 1978 [JP] Japan .................. 53/147350

[51] Int. Cl.³ .................. F16D 35/00; F16D 43/25
[52] U.S. Cl. .................. 192/58 B; 192/82 T
[58] Field of Search .................. 192/58 B, 82 T

[56] References Cited

U.S. PATENT DOCUMENTS

| | | | |
|---|---|---|---|
| 3,227,254 | 1/1966 | Sutaruk | 192/58 B |
| 3,363,734 | 1/1968 | Sabat | 192/58 B |
| 3,463,282 | 8/1969 | Fujita et al. | 192/58 B |
| 3,587,801 | 6/1971 | Riner | 192/82 T X |
| 3,690,428 | 9/1972 | LaFlame | 192/58 B |
| 3,841,451 | 10/1974 | Saylor et al. | 192/58 B |
| 4,051,936 | 10/1977 | Crisenbery et al. | 192/58 B |

FOREIGN PATENT DOCUMENTS 1074451 7/1967 United Kingdom .............. 192/58 B

Primary Examiner—Rodney H. Bonck
Attorney, Agent, or Firm—Oblon, Fisher, Spivak, McClelland & Maier

[57] ABSTRACT

A viscous fluid coupling device for controlling the revolutions per minute of a radiator cooling fan in three steps in response to the temperature of an engine. The viscous coupling device includes a rotor driven by an engine, a casing member, a cover member, a labyrinth formed between projections of the rotor and projections of the casing member, a partition plate dividing the interior of the casing member into an operating chamber and a reservoir chamber, a first oil returning passage and a first pump formed in the inner circumference of the partition plate, and a second oil returning passage and a second pump formed in the outer circumference of the partition plate, with temperature-controlled valve apparatus for controlling the passages to thus control the shearing force between the casing member and rotor.

4 Claims, 4 Drawing Figures

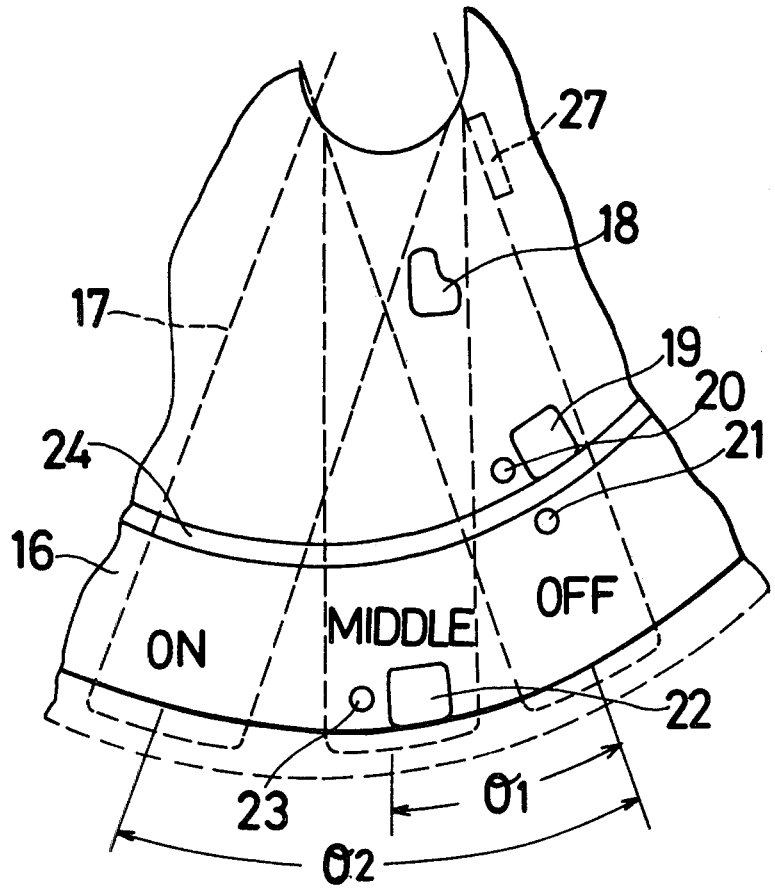

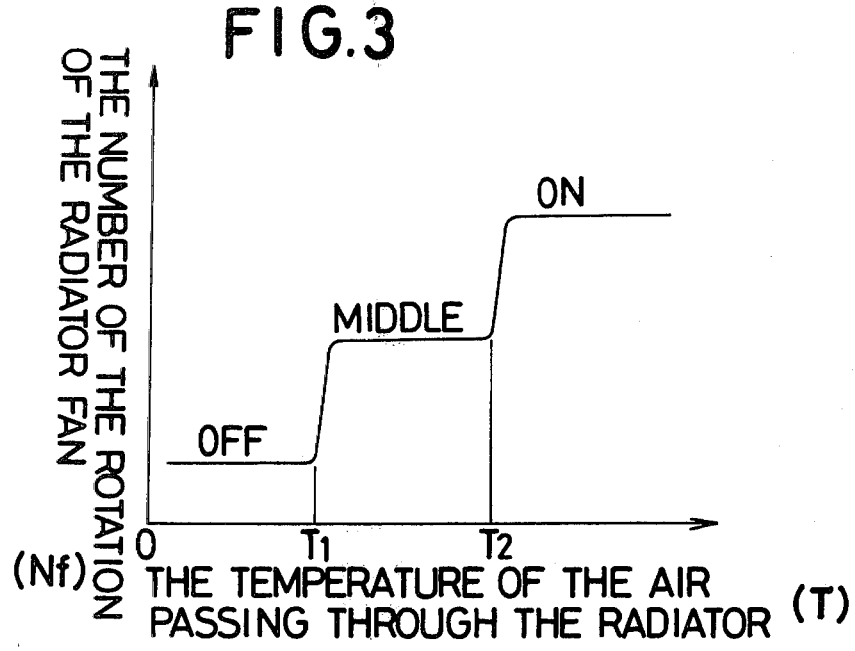
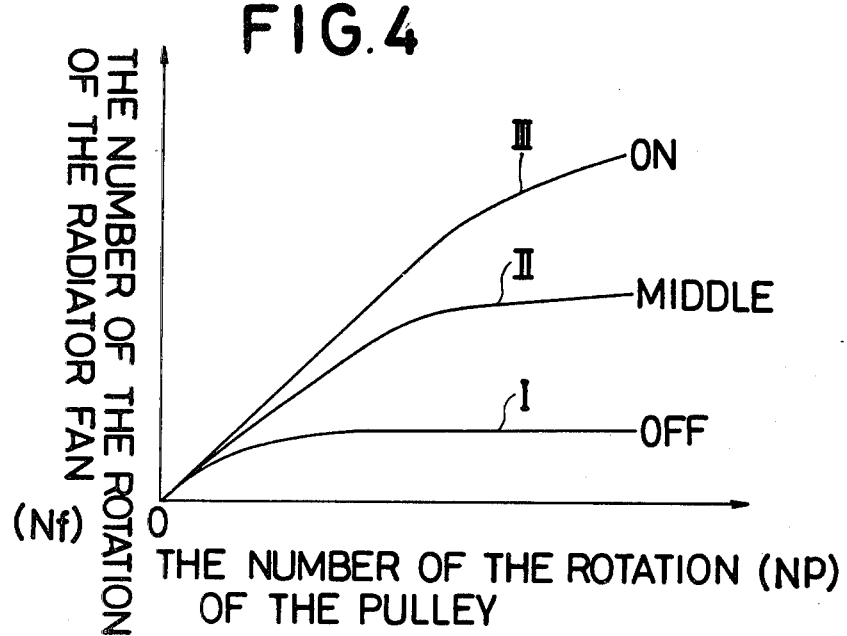

VISCOUS FLUID COUPLING DEVICE

BACKGROUND OF THE INVENTION

1. Field of the Invention:

This invention relates generally to a viscous fluid coupling device adapted for use in motor vehicles, and more particularly to a viscous fluid coupling device which controls the number of rotations of the radiator cooling fan in response to the temperature of the engine.

2. Description of the Prior Art:

Conventionally, thermally controlled viscous fluid coupling devices generally include an operating chamber for accommodating a rotor and a reservoir chamber for storing the operating oil. The revolutions per minute of the radiator cooling fan is controlled by means of supplying the operating oil from the operating chamber to the reservoir chamber and reducing the quantity of the operating oil in the operating chamber when the temperature of the engine is low, and by means of returning the operating oil supplied to the reservoir chamber and increasing the quantity of the operating oil in the operating chamber when the temperature of the engine is high. A valve plate rotated by a bimetal element is axially attached to a partition plate dividing the interior into the operating chamber and the reservoir chamber. The quantity of the operating oil returning from the reservoir chamber to the operating chamber is controlled by the valve plate, which acts to open and close an oil returning hole formed in the partition plate.

In a conventional viscous fluid coupling device of the thermally controlled type, however, there is only one mechanism for an oil returning hole and one mechanism for a pump hole. Accordingly, since the rotation of the radiator cooling fan is controlled by the temperature of the engine in two steps, including an ON-state and an OFF-state, the rotation of the radiator cooling fan cannot be precisely and accurately controlled in response to the temperature of the engine.

SUMMARY OF THE INVENTION

Therefore, it is a primary object of the present invention to provide a viscous fluid coupling device which eliminates the disadvantages of the conventional viscous fluid coupling devices.

It is another object of the present invention to provide a viscous fluid coupling device which controls the rotation of the radiator cooling fan precisely and accurately in response to the temperature of the engine.

It is also an object of the present invention to provide a viscous fluid coupling device which controls the rotation of the radiator cooling fan in three steps in response to the temperature of the engine.

It is still another object of this invention to provide a viscous fluid coupling device which is in particular adapted for diesel engines.

It is a further object of this invention to provide a viscous fluid coupling device which utilizes comparatively simple mechanical components, which is economical to manufacture and thoroughly reliable in operation.

BRIEF DESCRIPTION OF THE DRAWINGS

Various other objects, features and attendant advantages of the present invention will become more apparent upon reference to the succeeding detailed description thereof, and to the drawings illustrating a preferred embodiment thereof; wherein:

FIG. 3 and FIG. 4 are graphs of the characteristic curves of the viscous fluid coupling device in accordance with this invention.

DETAILED DESCRIPTION OF THE PREFERRED EMBODIMENTS

Figure 1:
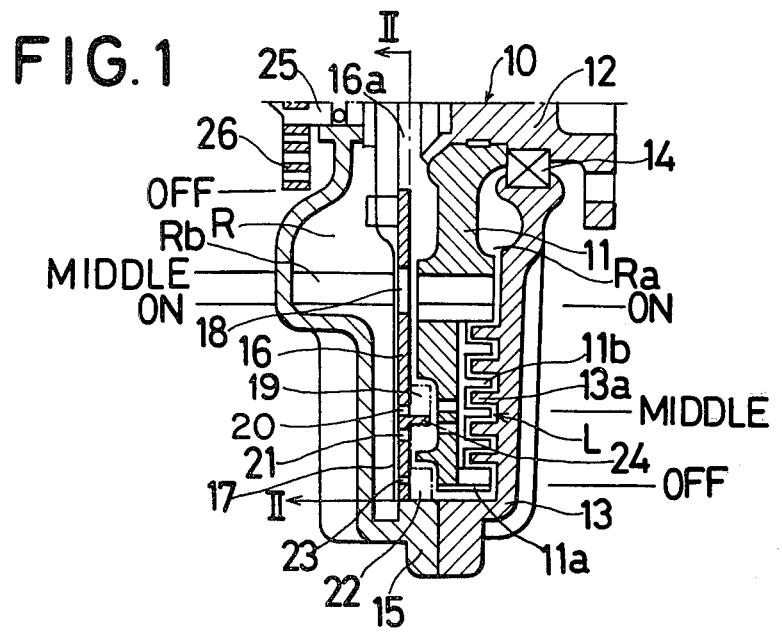
FIG. 1 is a cross-sectional view of a viscous fluid coupling device in accordance with one illustrative embodiment of this invention.

Referring now to FIG. 1, numeral 10 represents a viscous fluid coupling device. A rotor 11 is securely fixed to a shaft 12 at the top end thereof which is driven with the pulley (not shown) by the engine (not shown). The outer periphery of the rotor 11 is axially provided with several grooves 11a at regular intervals (in FIG. 1 only one groove is shown). Furthermore, on the back of the outer periphery several annular projections are axially formed at regular intervals. Casing member 13 is rotatably connected with and sealed to the shaft 12 by bearing 14, and a dish-shaped cover member 15 is connected with and sealed to the peripheral portion of the casing member 13. The inner wall of the casing member 13 is axially provided with several annular projections 13a which insert between each projection 11b of the rotor 11 keeping a constant gap and forming a labyrinth L.

Formed between the casing member 13 and the cover member 15 is a closed chamber R which contains the rotor 11 and the operating oil. Fixed to the inner wall of the cover member 15 is a circular partition plate 16 which divides the chamber R into an operating chamber Ra for accommodating the rotor 11 and a reservoir chamber Rb storing the operating oil. A valve plate 17 is rotatably attached on the axial center portion of the cover member 15, while a radiator cooling fan (not shown) is fixed to the peripheral portion of the cover member 15. The circular plate 16 is provided with a penetrating hole 16a at the center portion thereof.

Figure 2:
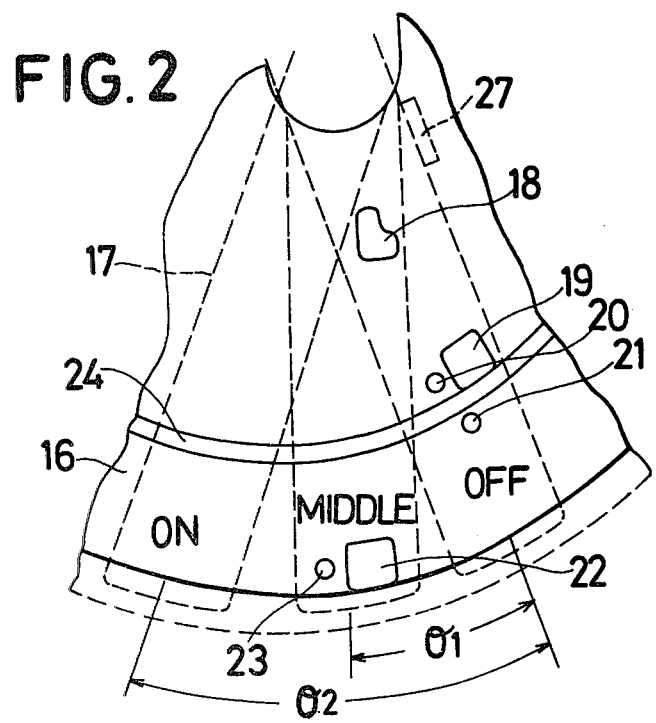
FIG. 2 is a sectional view taken along line II—II of FIG. 1, and showing the operational conditions of FIG. 1.

As shown in FIG. 2, the circular plate 16 is provided with a first oil returning hole 18, a first pump projection 19 and a first pump hole 20 in a first radial band of circumference, while a second radial band of circumference of the circular plate 16 located entirely radially outside of the first band of circumference, is provided with a second oil returning hole 21, a second pump projection 22 and a second pump hole 23. Furthermore, a ring-shaped dam 24 is formed between the first oil returning hole 18 and the second pump hole 23. The valve plate 17 is a rectangular plate and is fixed at its inner end to a rotational axis 25 axially supporting the cover member 15. Fixed on the front surface of the cover member 15 is a well-known swirl-shaped bimetal 26 which acts to move the valve plate 17 about the axis 25. Numeral 27 represents a stop which limits the rotation of the valve plate 17.

In operation of the viscous fluid coupling device 10, when the shaft 12 is rotated by the operation of the engine, the operating oil within the labyrinth L produces a shearing force. Therefore, when the shaft 12 rotates, the casing member 13 and the cover member 15 are rotated by the shearing force.

At first, when the temperature of the engine is low and the temperature T of the air passing through the radiator and coming in contact with the bimetal is lower than T1, the valve plate 17 is biased in the right hand direction as viewed in FIG. 2, and is maintained in the position in contact with the stop 27 as shown in FIG. 2. At this time, the valve plate 17 acts to close the first and second oil returning holes 18 and 21 and the first pump hole 20 and to open only the second pump hole 23. Accordingly, since relative rotation, namely, slipping is produced between the rotor 11 and the casing and cover members 13 and 15, the operating oil in the rotor chamber Ra is transmitted through the second pump hole 23 to the reservoir chamber Rb and is reserved within the reservoir chamber Rb. As a result, since the shearing force produced by the operating oil within the labyrinth L is the smallest, the relative rotation produced between the rotor 11 and the casing and cover members 13 and 14 will be the greatest, that is to say, the viscous fluid coupling device 10 is maintained in OFF-state as shown in FIG. 3. Therefore, in this case, the number Nf of rotations of the radiator cooling fan to the number Np of rotations of the pulley changes as shown in characteristic curve I of FIG. 4. Consequently, warming of the engine can be attained in a short time.

Secondly, when the temperature of the engine reaches a degree for efficient operation and the temperature of the air passing through the radiator is between T1 and T2 (provided that $T_2$ is greater than $T_1$, namely $T_1 < T_2$), the valve plate 17 is rotated clockwise. Since the rotational angle of the valve plate is maintained in $\theta_1$-position as shown in FIG. 2, the valve plate 17 acts to open the first pump hole 20 and the second oil returning hole 21 and to close the first oil returning hole 18 and the second pump hole 23. Accordingly, the operating oil in the inside of the dam 24 in the operating chamber Ra is transmitted by the first pump projection 19 to the reservoir chamber Rb through the first pump hole 20 and is reserved within the reservoir chamber Rb. At the same time, part of the operating oil transmitted to the reservoir chamber Rb is returned through the second oil returning hole 21 to the operating chamber Ra. Under this condition, the operating chamber Ra is filled only in the outside of the dam 24 with the operating oil. As a result, since the shearing force produced by the operating oil within the labyrinth L reaches a predetermined level, the relative rotation produced between the rotor 11 and the casing and cover members 13 and 15 reaches a predetermined level, that is to say, the viscous fluid coupling device 10 is maintained in MIDDLE-state as shown in FIG. 3. Therefore, in this case, the number Nf of rotations of the radiator cooling fan to the number Np of rotations of the pulley changes as shown in characteristic curve II of FIG. 4. Consequently, the engine can be efficiently cooled.

Thirdly, when the temperature of the engine rises further and the temperature of the air passing through the radiator rises beyond $T_2$, the valve plate 17 is further rotated clockwise. Since the rotational angle of the valve plate 17 is maintained in $\theta_2$-position as shown in FIG. 2, the valve plate 17 acts to open all the holes, namely the first and second oil returning holes 18 and 21 and the first and second pump holes 20 and 23. Accordingly, the operating oil transmitted from the operating chamber Ra to the reservoir chamber Rb through the first and second pump holes 20 and 23 is promptly returned to the operating chamber Ra through the first and second oil returning holes 18 and 21, and the operating chamber Ra is filled with the operating oil. As a result, since the shearing force produced by the operating oil within the labyrinth L becomes the greatest, the relative rotation produced between the rotor 11 and the casing and cover members 13 and 15 becomes the smallest, that is to say, the viscous fluid coupling device 10 is maintained in ON-state as shown in FIG. 3. Therefore, in this case, the number Nf of rotations of the radiator cooling fan to the number Np of rotations of the pulley changes as shown in characteristic curve III of FIG. 4. Consequently, the engine can be rapidly cooled.

From the above, it will be seen that this invention provides the effect that the rotation of the radiator cooling fan can be precisely and accurately controlled in response to the changes of the temperature of the engine. That is to say, the rotation of the radiator cooling fan can be controlled in three steps consisting of OFF-state, MIDDLE-state and ON-state. In particular, this invention can be adapted for diesel engines. That is to say, a large quantity of wind can be supplied when the engine is driven at a high speed and the temperature of the engine is high, the noise can be lowered when the engine is accelerated, and furthermore, the consumption of fuel can be reduced.

Although the invention has been described with respect to a specific preferred embodiment thereof, obviously those skilled in the art may make various changes in the details and arrangements of parts without departing from the spirit and scope of the invention as defined by the claims hereto appended, and it is therefore desired that the invention not be restricted to the precise construction herein disclosed.

What is claimed as new and desired to be secured by Letters Patent of the United States is:

1. A viscous fluid coupling device for controlling the revolutions per minute of a radiator cooling fan in response to the temperature of an engine, said coupling device comprising:
   a rotor securely fixed to a shaft driven by an engine;
   a casing member connected with said shaft for rotation relative thereto;
   a cover member connected with said casing member;
   a labyrinth formed between projections of said rotor and projections of said casing member;
   a closed chamber being formed between said casing member and said cover member and containing said rotor and a quantity of operating oil;
   a partition plate dividing said closed chamber into an operating chamber accommodating said rotor and a reservoir chamber storing said operating oil; a valve plate rotatably attached on said cover member;
   said partition plate provided in a first band of circumference thereof with first oil returning means and first pump means, and in a second band of circumference thereof with second oil returning means and second pump means, said second band being entirely radially outside said first band;
   thermally responsive means connected with the valve plate to control movement thereof in response to temperature to control the oil returning means and thus control the shear force between the rotor and casing member; and
   dam means formed between said first and second bands of circumference.

2. A viscous fluid coupling device according to claim 1, wherein said first and second oil returning means include first and second oil returning holes, respectively, said first and second pump means include first and second pump projections and first and second pump holes, respectively.

3. A viscous fluid coupling device according to claim 1, wherein the thermally responsive means comprises a swirl-shaped bimetal element fixed to the cover member and acting to move said valve plate.

4. A viscous fluid coupling device for the radiator cooling fan of an engine, comprising:
- a shaft connected to be driven by an engine;
- a casing member connected to the shaft for rotation relative thereto;
- a cover member connected to the casing member, and with the casing member defining a closed chamber;
- a partition dividing the closed chamber into an operating chamber and a reservoir chamber for storing a quantity of operating fluid;
- a rotor fixedly carried by the shaft for rotation in the operating chamber;
- said rotor and casing member having cooperating means for producing a shear force therebetween when operating oil is present in the operating chamber;
- a plurality of openings through the partition between the reservoir chamber and operating chamber;
- dam means formed on said partition;
- pump means for pumping operating fluid through the openings into the reservoir chamber; and
- thermally responsive valve means for controlling flow through the openings in response to engine temperature, to obtain staged control of the speed of rotation of the casing member and a cooling fan connected thereto, whereby at low engine temperature the fan is rotated at a low speed for effecting rapid warming of the engine, at an intermediate temperature range of the engine the fan is operated at a medium speed for moderate cooling of the engine to maintain efficient operation thereof, and at high engine temperature the fan is rotated at a high speed to effect maximum cooling of the engine;
- wherein said openings and said pump means are formed in two sets, a first one of said sets being radially inward of said dam means and a second one of said sets being radially outward of said dam means.

* * * * *